United States Patent
Nishizaki et al.

(10) Patent No.: US 11,316,998 B2
(45) Date of Patent: Apr. 26, 2022

(54) IMAGE PROCESSING APPARATUS, IMAGE PROCESSING METHOD, AND RECORDING MEDIUM FOR DETERMINING AN OPERATING FREQUENCY IN ACCORDANCE WITH A TYPE OF A NETWORK PACKET

(71) Applicants: Kohei Nishizaki, Kanagawa (JP); Shigeru Tosa, Kanagawa (JP); Yamato Takahashi, Kanagawa (JP); Kohichi Sadano, Kanagawa (JP)

(72) Inventors: Kohei Nishizaki, Kanagawa (JP); Shigeru Tosa, Kanagawa (JP); Yamato Takahashi, Kanagawa (JP); Kohichi Sadano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 106 days.

(21) Appl. No.: 16/883,106

(22) Filed: May 26, 2020

(65) Prior Publication Data

US 2020/0382672 A1 Dec. 3, 2020

(30) Foreign Application Priority Data

Jun. 3, 2019 (JP) .............................. JP2019-103980

(51) Int. Cl.
*H04N 1/00* (2006.01)
*G06F 1/324* (2019.01)

(52) U.S. Cl.
CPC ......... *H04N 1/00896* (2013.01); *G06F 1/324* (2013.01); *H04N 1/00904* (2013.01)

(58) Field of Classification Search
None
See application file for complete search history.

(56) References Cited

U.S. PATENT DOCUMENTS

| | | | |
|---|---|---|---|
| 2006/0092241 A1 | 5/2006 | Sadano | |
| 2008/0019718 A1 | 1/2008 | Akatsu et al. | |
| 2009/0027432 A1 | 1/2009 | Watanabe et al. | |
| 2011/0007679 A1* | 1/2011 | Tsai | H04M 1/73 370/311 |
| 2011/0057971 A1 | 3/2011 | Yokoyama et al. | |
| 2011/0097094 A1 | 4/2011 | Hamano et al. | |
| 2011/0222094 A1 | 9/2011 | Sadano | |
| 2015/0186160 A1* | 7/2015 | Arora | G06F 11/3423 713/1 |
| 2017/0315606 A1 | 11/2017 | Tanaka | |

FOREIGN PATENT DOCUMENTS

| | | |
|---|---|---|
| JP | 2012-010289 | 1/2012 |
| JP | 2017-201456 | 11/2017 |

OTHER PUBLICATIONS

U.S. Appl. No. 16/800,076, filed Feb. 25, 2020, Kohei Nishizaki, et al.

* cited by examiner

*Primary Examiner* — Lennin R Rodriguezgonzalez
(74) *Attorney, Agent, or Firm* — IPUSA, PLLC

(57) ABSTRACT

An image processing apparatus includes a first processor and a second processor. The first processor has a power saving function. The second processor is configured to consume less power than the first processor during operation. When the first processor stopped by the power saving function is activated in response to reception of a network packet, the first processor determines an operating frequency of the first processor in accordance with a type of the network packet.

13 Claims, 11 Drawing Sheets

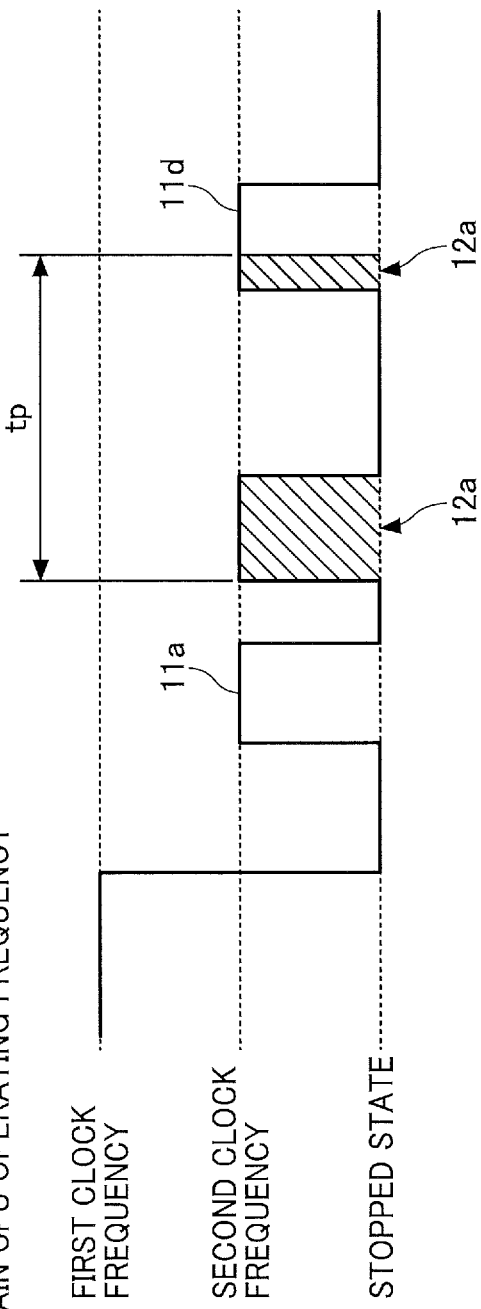

FIG. 6

| RESPONSE LEVEL | DESCRIPTION OF NETWORK PACKET | NECESSITY OF IMMEDIATE RESPONSE | OPERATING FREQUENCY OF MAIN CPU |
|---|---|---|---|
| 4 | IMMEDIATE RESPONSE NECESSARY | NECESSARY | FIRST CLOCK FREQUENCY |
| 3 | WITH FIRST CLOCK FREQUENCY, PACKET RESPONSE PROCESS CAN BE COMPLETED WITHIN PREDETERMINED PERIOD | UNNECESSARY | FIRST CLOCK FREQUENCY |
| 2 | WITH SECOND CLOCK FREQUENCY, PACKET RESPONSE PROCESS CAN BE COMPLETED WITHIN PREDETERMINED PERIOD | UNNECESSARY | SECOND CLOCK FREQUENCY |
| 1 | PRIORITY ON PACKET RESPONSE TIME IS LOW | UNNECESSARY | SECOND CLOCK FREQUENCY |
| UNDETERMINED | NOT STORED IN PACKET INFORMATION TABLE | NECESSARY | FIRST CLOCK FREQUENCY |

51b

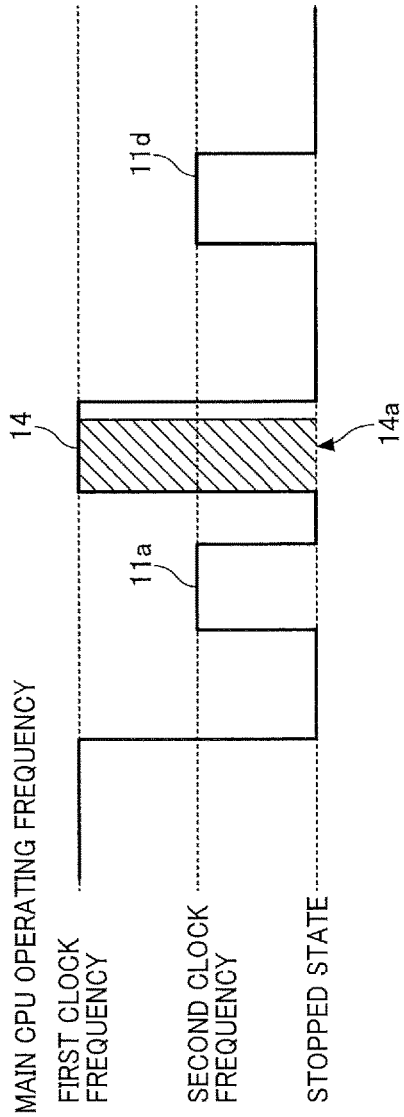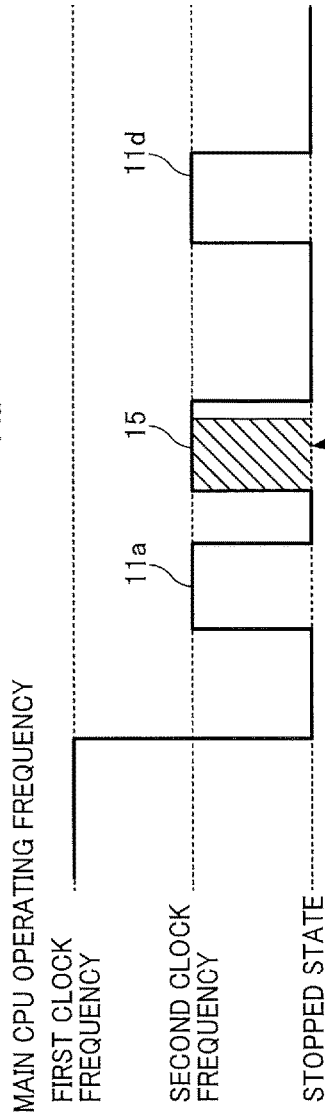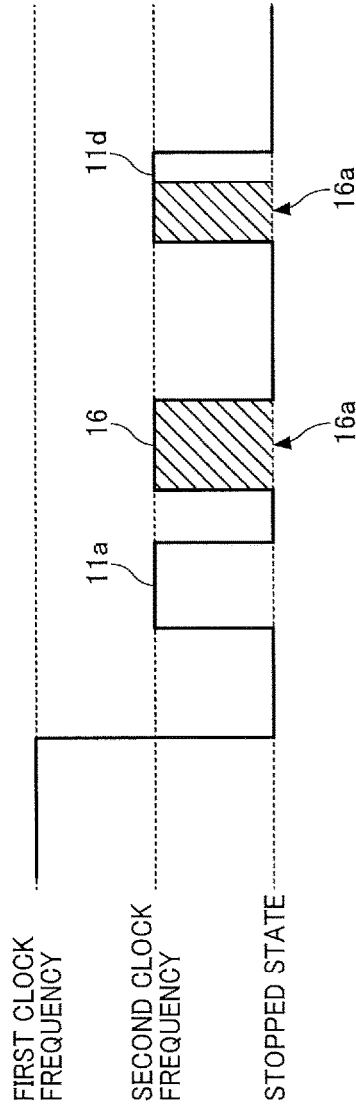

IMAGE PROCESSING APPARATUS, IMAGE PROCESSING METHOD, AND RECORDING MEDIUM FOR DETERMINING AN OPERATING FREQUENCY IN ACCORDANCE WITH A TYPE OF A NETWORK PACKET

CROSS-REFERENCE TO RELATED APPLICATION

This patent application is based on and claims priority pursuant to 35 U.S.C. § 119(a) to Japanese Patent Application No. 2019-103980, filed on Jun. 3, 2019, in the Japan Patent Office, the entire disclosure of which is hereby incorporated by reference herein.

BACKGROUND

Technical Field

Aspects of the present disclosure relate to an image processing apparatus, an image processing method, and a recording medium.

Related Art

For an image forming apparatus such as a multifunction peripheral (MFP) or the like, there is a known technique of suspending the power supply to a central processing unit (CPU) and a random access memory (RAM) in a standby state to reduce power consumption.

There is also a known apparatus that includes a main CPU and a sub CPU. In a case where a process not to be performed by the sub CPU is generated while the main CPU is stopped by a power saving function, the sub CPU activates the main CPU at an operating frequency whose upper limit is a lower frequency than the highest clock frequency.

SUMMARY

In an aspect of the present disclosure, there is provided an image processing apparatus that includes a first processor and a second processor. The first processor has a power saving function. The second processor is configured to consume less power than the first processor during operation. When the first processor stopped by the power saving function is activated in response to reception of a network packet, the first processor determines an operating frequency of the first processor in accordance with a type of the network packet.

In another aspect of the present disclosure, there is provided an image processing method for an image processing apparatus that includes a first processor having a power saving function and a second processor configured to consume less power than the first processor during operation. The image processing method includes determining an operating frequency of the first processor in accordance with a type of a network packet when the first processor stopped by the power saving function is activated in response to reception of the network packet.

In still another aspect of the present disclosure, there is provided a non-transitory recording medium storing program code to be executed by an image processing apparatus including a first processor having a power saving function and a second processor that consumes less power than the first processor during operation, the program code causing a computer to perform a process of determining an operating frequency of the first processor in accordance with a type of a network packet when the first processor stopped by the power saving function is activated in response to reception of the network packet.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a graph illustrating a polling operation; and FIG. 1B is a graph illustrating an operation to respond to a network packet;

FIG. 2 is a graph for explaining a delay of a packet response process in the image processing apparatus according to the comparative example;

FIG. 6 is a diagram illustrating an example of another part of the packet information table according to the embodiment;

FIGS. 8A to 8C are graphs for explaining other examples of packet response processes in the image processing apparatus according to the embodiment: FIG. 8A is a graph illustrating a case where a packet response process can be completed at a first clock frequency; FIG. 8B is a graph illustrating a case where a packet response process can be completed at a second clock frequency; and FIG. 8C is a graph illustrating a case where the priority on a packet response process time is low;

Figure 1A:
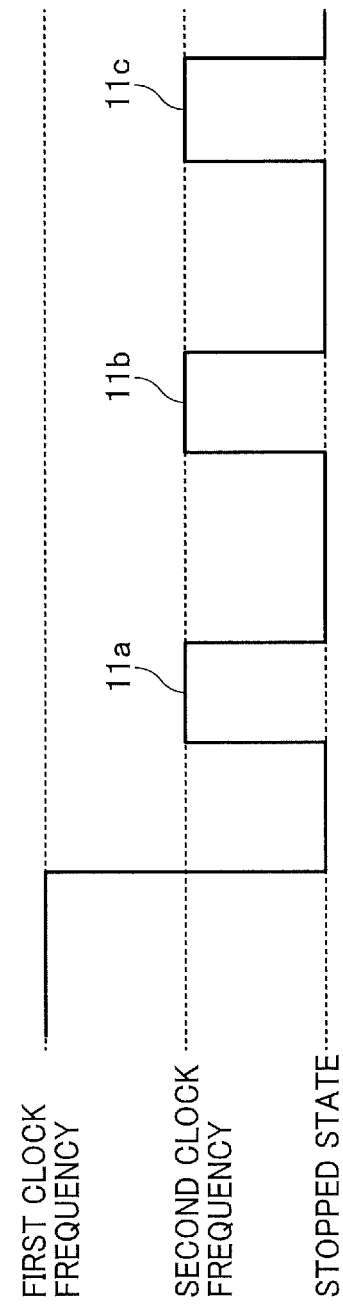
FIGS. 1A and 1B are graphs each illustrating a power saving operation of an image processing apparatus according to a comparative example.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. In the drawings, like components are denoted by like reference numerals, and explanation of them will not be repeated more than once in some cases.

An image processing apparatus according to an embodiment includes a main central processing unit (CPU) having a power saving function, and a sub CPU that consumes less power during operation than the main CPU. In a case where the main CPU stopped by the power saving function is activated in response to reception of a network packet, the operating frequency of the main CPU is determined in accordance with the type of the network packet. Here, the main CPU is an example of a first processor, and the sub CPU is an example of a second processor.

Specific examples of an image processing apparatus according to the embodiment include a multifunction peripheral or printer (MFP) and a printer that have a power saving function and a wireless or wired communication function. However, an image processing apparatus according to the embodiment is not necessarily the above, and may be a projector (PJ), an interactive whiteboard (IWB: a whiteboard that is capable of interactive communication and has an electronic blackboard function), an output device for digital signage or the like, a head-up display (HUD) apparatus, an industrial machine, an imaging apparatus, a sound collecting apparatus, medical equipment, network home appliance, a connected car (automobile), a notebook personal computer (PC), a mobile phone, a smartphone, a tablet terminal, a game machine, a personal digital assistant (PDA), a digital camera, a wearable PC, a desktop PC, or the like, as long as the image processing apparatus has a power saving function and a wireless or wired communication function.

Here, the power saving function is a function to switch the image processing apparatus to a power saving state for reducing power consumption, under a predetermined transition condition, such as that no operation has been performed on the image processing apparatus over a predetermined period of time. The power saving state of the image processing apparatus includes a state in which power supply to the main CPU is suspended, and the main CPU is stopped.

Figure 1B:
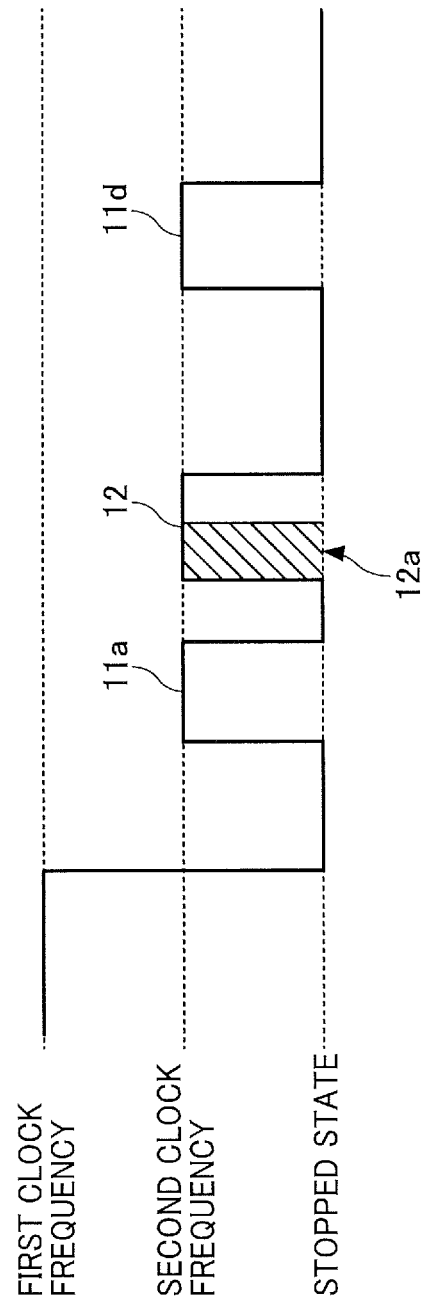

Power Saving Operation of an Image Processing Apparatus According to a Comparative Example First, a power saving operation of an image processing apparatus 10 according to a comparative example is described with reference to FIGS. 1A to 2. FIGS. 1A and 1B are graphs each illustrating an example of an operating frequency of the main CPU included in the image processing apparatus 10 in a power saving state. FIG. 1A is a graph illustrating a case where the main CPU performs polling. FIG. 1B is a graph illustrating a case where the main CPU responds to a network packet. In FIGS. 1A and 1B, the abscissa axis indicates time, and the ordinate axis indicates the operating frequency of the main CPU.

When the image processing apparatus 10 switches to a power saving state, the main CPU is put into a stopped state. However, as illustrated in FIG. 1A, the main CPU is activated for a predetermined period at predetermined intervals, to perform polling. Note that "polling" is a control method for the image processing apparatus 10 to sequentially inquire of other apparatuses at regular intervals whether there is a request.

In FIG. 1A, each of polling activation periods 11a through 11c is a period during which the main CPU in a stopped state is activated for polling. In each of the polling activation periods 11a through 11c, the main CPU operates at a clock frequency whose upper limit is a lower clock frequency than the highest clock frequency. As described above, when the main CPU is activated for polling, the clock frequency of operation of the main CPU (this clock frequency will be hereinafter referred to as the operating frequency) is lowered, so that power saving performance is improved.

The highest clock frequency, and the clock frequency whose upper limit is a lower clock frequency than the highest clock frequency are set in advance. The highest clock frequency is a clock frequency or the like in a normal operating state that is not a power saving state. Here, the highest clock frequency is an example of a "first clock frequency", and the clock frequency whose upper limit is a lower clock frequency than the highest clock frequency is an example of a "second clock frequency". In the description below, the highest clock frequency will be referred to as "first clock frequency", and the clock frequency having a lower clock frequency than the highest clock frequency as the upper limit will be referred to as "second clock frequency".

When an activation factor occurs in the power saving state, the main CPU is activated by an interrupt in response to the activation factor, irrespective of the polling activation periods. Here, the activation factor is a factor for activating the main CPU stopped by the power saving function and restoring the operation. Specific examples of the activation factor include reception of a network packet, an operation performed by a user on an operation panel, and the like.

An interrupt activation period 12 in FIG. 1B indicates a period during which the main CPU is activated by an interrupt accompanying reception of a network packet. The length of the interrupt activation period 12 is set in advance. In the interrupt activation period 12 in FIG. 1B, the period indicated by hatching is a packet response process period 12a. Here, a packet response process period is a period from the time when the main CPU starts a packet response process till the time when the main CPU completes the packet response process. A packet response process is a process to be executed when a network packet is received. The packet response process includes a process of receiving a network packet, a process of automatically transmitting a notification in response to the received network packet, and the like.

In FIG. 1B, after the polling activation period 11a, the main CPU is activated by an interrupt accompanying reception of a network packet during the interrupt activation period 12. The packet response process is completed within the interrupt activation period 12. After that, during a polling activation period 11d, the main CPU is activated for polling.

FIG. 2 is a graph illustrating a delay in a packet response process in the image processing apparatus 10. The abscissa axis and the ordinate axis in FIG. 2 are the same as those in FIGS. 1A and 1B, and therefore, explanation thereof is not made herein. In the description below, the abscissa axis and the ordinate axis in the graphs for explaining a packet response process are the same as above.

In FIG. 2, after the polling activation period 11a, the main CPU is activated by an interrupt accompanying reception of a network packet during the interrupt activation period 12. Here, the length of the packet response process period 12a varies depending on the type of network packet. Therefore, depending on the type of the network packet, a packet response process might not be completed within the predetermined interrupt activation period 12.

In the example illustrated in FIG. 2, the main CPU does not complete the response process for the network packet within the interrupt activation period 12, and the packet response process left unprocessed is executed during the next polling activation period 11d. As a result, the packet response process is delayed by the amount equivalent to the time from the end of the interrupt activation period 12 till the start of the next polling activation period 11d, and the time tp required for the packet response process becomes longer accordingly. Because of this, when a network packet requesting an immediate response is received, a packet response process might not be appropriately performed due to delay.

In the embodiment, the operating frequency of the main CPU is determined in accordance with the type of the network packet in such a case. Alternatively, the predetermined activation period for the main CPU is extended in accordance with the type of the network packet. Thus, an appropriate response can be made to a network packet that requests an immediate response, while power consumption is reduced. This aspect will be described below in detail.

Figure 3:
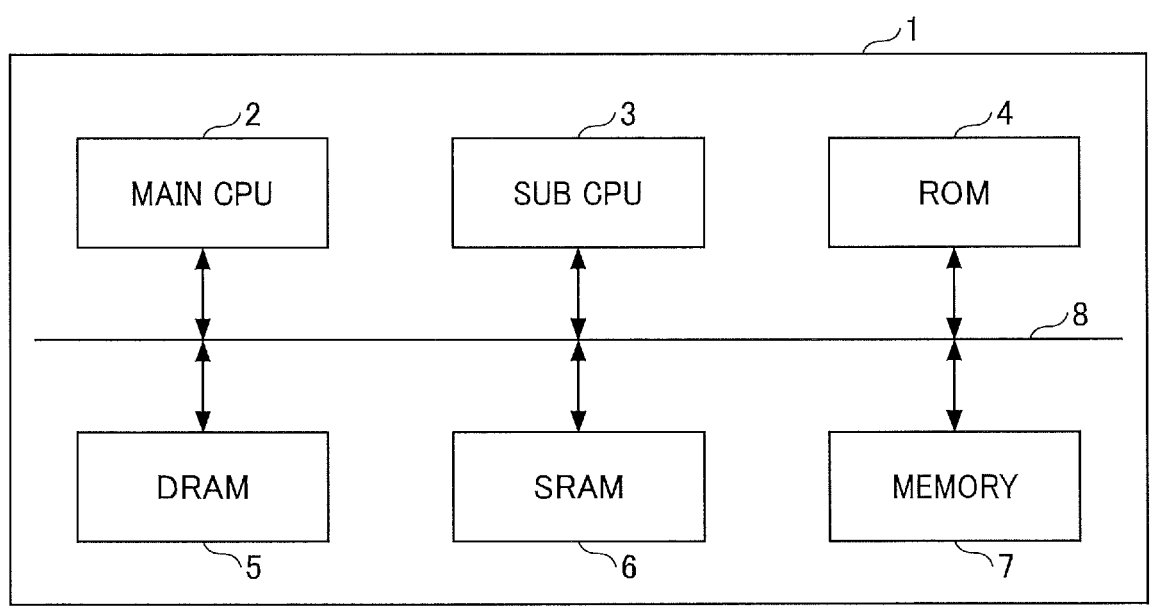
FIG. 3 is a block diagram illustrating an example of the hardware configuration of an image processing apparatus according to an embodiment.

Hardware Configuration of an Image Processing Apparatus 1 According to an Embodiment First, the hardware configuration of an image processing apparatus 1 according to the embodiment is described. FIG. 3 is a block diagram illustrating an example of the hardware configuration of the image processing apparatus 1. As illustrated in FIG. 3, the image processing apparatus 1 includes a main CPU 2, a sub CPU 3, a read only memory (ROM) 4, a dynamic random access memory (DRAM) 5, a static random access memory (SRAM) 6, and a memory 7. These components are electrically connected to one another via a bus 8.

The main CPU 2 is formed with a processor or the like, and controls operations of the respective components of the image processing apparatus 1 and the overall operation. The main CPU 2 has a power saving function, switches to a power saving state under a predetermined transition condition, and stops the operation.

The sub CPU 3 is formed with a processor or the like, and controls operations of the respective components of the image processing apparatus 1 and the entire operation while the main CPU 2 is stopped by the power saving function.

The ROM 4 is formed with a nonvolatile semiconductor storage device or the like, and stores various programs and various parameters to be executed or used in the image processing apparatus 1.

The DRAM 5 is formed with a volatile semiconductor storage device or the like, and is used as a work area of the main CPU 2. Various programs and various parameters to be executed or used by the main CPU 2 are read from the ROM 4 and are loaded into the DRAM 5. The main CPU 2 executes each coded command in the programs loaded into the DRAM 5.

The SRAM 6 is formed with a volatile semiconductor storage device or the like, and is used as a work area of the sub CPU 3. Various programs and various parameters to be executed or used by the sub CPU 3 in a power saving state are read from the ROM 4 and are loaded into the SRAM 6. The sub CPU 3 executes each coded command in the programs developed into the SRAM 6.

The memory 7 stores information such as the data to be used in the various programs. The memory 7 is formed with a storage device such as a volatile or nonvolatile semiconductor memory, a hard disk drive (HDD), or a solid state drive (SSD). The memory 7 may include the ROM 4.

The programs are not necessarily stored in a nonvolatile semiconductor storage device such as the ROM 4 or the memory 7, but may be stored in a recording medium such as a recording disc or disk. Alternatively, the programs may be transmitted via a wired network, a wireless network, broadcasting, or the like, and be then loaded into the DRAM 5 and the SRAM 6.

First Embodiment

Figure 4:
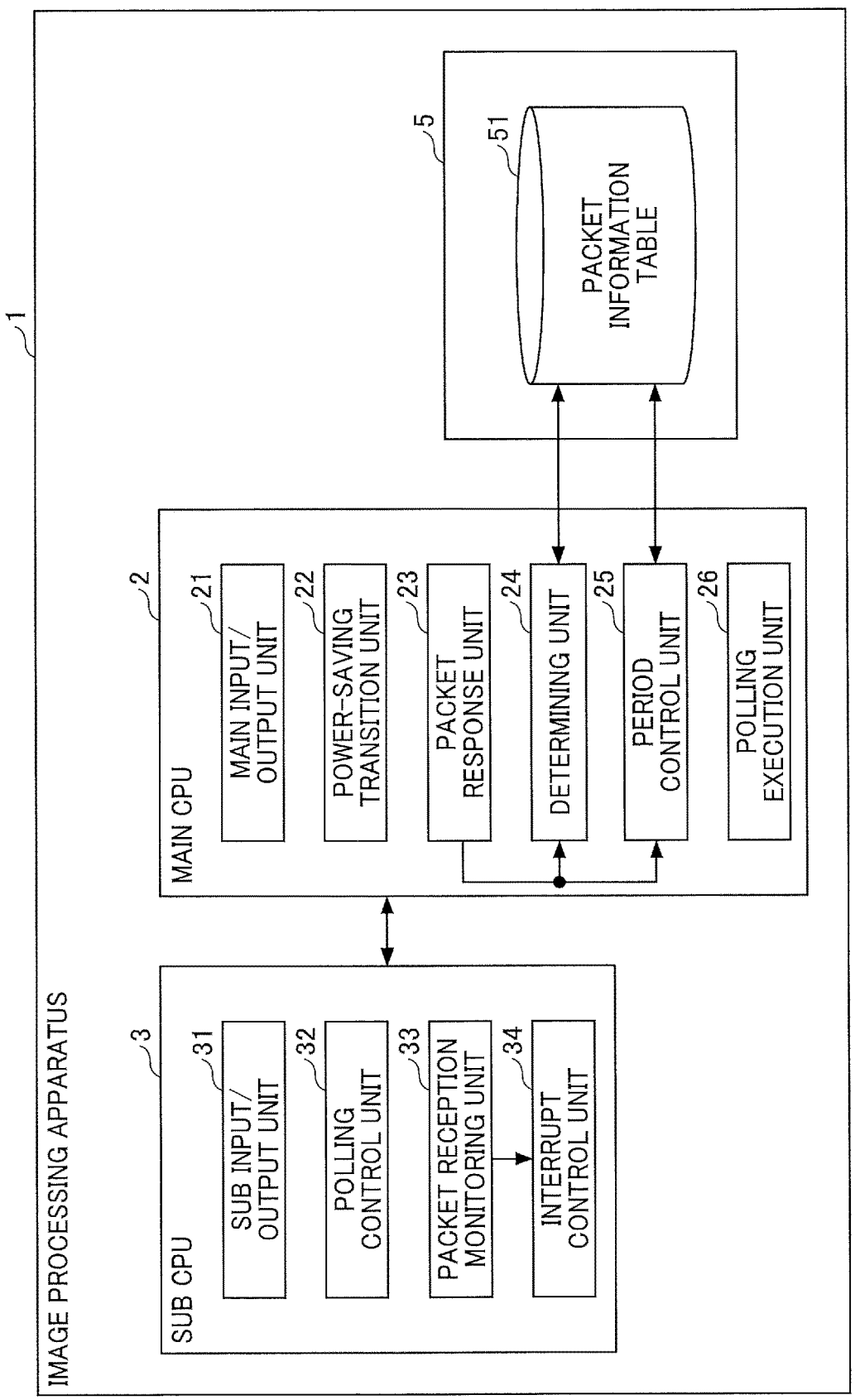
FIG. 4 is a block diagram illustrating an example of the functional configuration of an image processing apparatus according to a first embodiment.

Functional Configuration of the Image Processing Apparatus 1 According to a First Embodiment Next, the functional configuration of the image processing apparatus 1 is described. FIG. 4 is a block diagram illustrating an example of the functional configuration of the image processing apparatus 1. As illustrated in FIG. 4, the image processing apparatus 1 includes a sub input/output unit 31, a polling control unit 32, a packet reception monitoring unit 33, and an interrupt control unit 34. The image processing apparatus 1 also includes a main input/output unit 21, a power-saving transition unit 22, a packet response unit 23, a determining unit 24, a period control unit 25, a polling execution unit 26, and a packet information table 51.

Among these components, the functions of the sub input/output unit 31, the polling control unit 32, the packet reception monitoring unit 33, and the interrupt control unit 34 are realized by the sub CPU 3 executing a predetermined program. Likewise, the functions of the main input/output unit 21, the power-saving transition unit 22, the packet response unit 23, the determining unit 24, the period control unit 25, and the polling execution unit 26 are formed by the main CPU 2 executing a predetermined program. The functions of the packet information table 51 are realized by the DRAM 5 or the like.

The sub input/output unit 31 performs inputting/outputting and/or transmission/reception of data and signals between hardware components such as the main CPU 2 and the SRAM 6, and the sub CPU 3.

To cause the main CPU 2 to perform polling, the polling control unit 32 outputs a control signal to the main CPU 2 via the sub input/output unit 31, and activates the main CPU 2 stopped by the power saving function for a predetermined first period at predetermined intervals.

The packet reception monitoring unit 33 monitors reception of a network packet by the image processing apparatus 1, and notifies the interrupt control unit 34 of reception of a network packet when the image processing apparatus 1 receives the network packet.

When notified of reception of a network packet from the packet reception monitoring unit 33, the interrupt control unit 34 outputs a control signal to the main CPU 2 via the sub input/output unit 31, to activate the main CPU 2 stopped by the power saving function for a predetermined second period.

The main input/output unit 21 performs inputting/outputting and/or transmission/reception between hardware components such as the sub CPU 3 and the DRAM 5, and the main CPU 2.

The power-saving transition unit 22 switches the image processing apparatus 1 to a power saving state under a predetermined transition condition.

The packet response unit 23 performs a packet response process within the first period during which the main CPU is activated by the polling control unit 32 or within the second period during which the main CPU 2 is activated by the interrupt control unit 34. The packet response unit 23 also acquires protocol information analyzed in the process of receiving a network packet as packet type information indicating the type of the network packet, and outputs the packet type information to both the determining unit 24 and the period control unit 25.

In accordance with the packet type information input from the packet response unit 23, the determining unit 24 determines the operating frequency of the main CPU 2 by referring to the packet information table 51.

More specifically, the result of reference to the packet information table 51 in accordance with the packet type information shows that the received network packet requests an immediate response, the determining unit 24 determines the first clock frequency to be the operating frequency of the main CPU 2. In other words, in a case where the determining unit 24 determines the first clock frequency to be the operating frequency of the main CPU 2, the determining unit 24 raises the operating frequency of the main CPU 2 from the second clock frequency to the first clock frequency when the main CPU 2 stopped by the power saving function is activated.

In a case where the received network packet does not request an immediate response, on the other hand, the determining unit 24 determines the second clock frequency to be the operating frequency of the main CPU 2. In other words, in a case where the determining unit 24 determines the first clock frequency to be the operating frequency of the main CPU 2, the determining unit 24 does not raise the operating frequency of the main CPU 2 but keeps the operating frequency of the main CPU 2 at the second clock frequency when the main CPU 2 stopped by the power saving function is activated.

The packet response unit 23 operates at the clock frequency determined by the determining unit 24 and performs a packet response process during the period during which the main CPU 2 stopped by the power saving function is activated by the polling control unit 32 or the interrupt control unit 34.

In accordance with the packet type information input from the packet response unit 23, the period control unit 25 refers to the packet information table 51, and acquires immediate response necessity information. In accordance with the acquired immediate response necessity information, the period control unit 25 extends the period during which the main CPU 2 stopped by the power saving function is activated by the polling control unit 32 or the interrupt control unit 34 from the predetermined activation period.

More specifically, in a case where the received network packet requests an immediate response, the period control unit 25 extends the period during which the main CPU 2 stopped by the power saving function is activated by the polling control unit 32 or the interrupt control unit 34. In a case where the received network packet does not request an immediate response, on the other hand, the period control unit 25 does not extend the period during which the main CPU 2 stopped by the power saving function is activated by the polling control unit 32 or the interrupt control unit 34.

In a case where the timing at which the image processing apparatus 1 receives the network packet is included in the first period during which the main CPU 2 is activated by the polling control unit 32, the period control unit 25 extends the first period during which the main CPU 2 is activated by the polling control unit 32. In a case where the timing at which the image processing apparatus 1 receives the network packet is not included in the first period during which the main CPU 2 is activated by the polling control unit 32, the period control unit 25 extends the second period during which the main CPU 2 is activated by the interrupt control unit 34.

In a case where the first period is extended, before the determining unit 24 raises the clock frequency, the period control unit 25 requests the polling control unit 32 to keep the main CPU 2 operating via the main input/output unit 21 and the sub input/output unit 31. After the packet response process is completed, the period control unit 25 notifies the polling control unit 32 via the main input/output unit 21 and the sub input/output unit 31 that the operation of the main CPU 2 can be stopped. The polling control unit 32 keeps the main CPU 2 operating until receipt of a notification that the operation can be stopped.

In a case where the second period is extended, before the determining unit 24 raises the clock frequency, the period control unit 25 requests the interrupt control unit 34 to keep the main CPU 2 operating via the main input/output unit 21 and the sub input/output unit 31. After the packet response process is completed, the period control unit 25 notifies the interrupt control unit 34 via the main input/output unit 21 and the sub input/output unit 31 that the operation of the main CPU 2 can be stopped. The interrupt control unit 34 keeps the main CPU 2 operating until receipt of a notification that the operation can be stopped.

In this manner, the period during which the main CPU 2 stopped by the power saving function is activated is extended till completion of the packet response process. The packet response unit 23 can perform the packet response process within the predetermined activation period and the extended period.

The polling execution unit 26 performs polling within the first period during which the main CPU 2 is activated by the polling control unit 32.

Figure 5:
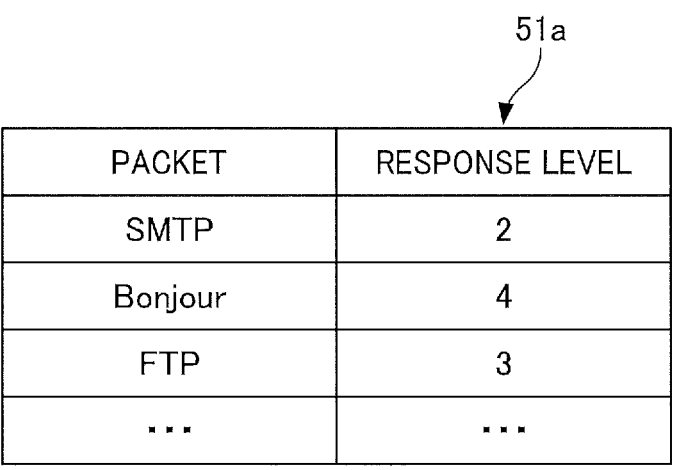
FIG. 5 is a diagram illustrating an example of part of a packet information table according to the embodiment.

FIG. 5 is a diagram illustrating an example of a correspondence table 51a indicating the relationship between the network packet types and response levels included in the packet information table 51. In FIG. 5, the left column illustrates types of network packets, and the right column illustrate the response levels for the respective types of network packets. Here, a response level is information for identifying the response time required for a packet response process.

As described above, the packet response unit 23 acquires the protocol information analyzed in the process of receiving a network packet as the packet type information, and outputs the packet type information to both the determining unit 24 and the period control unit 25. In accordance with the input packet type information, the determining unit 24 and the period control unit 25 each acquire a response level by referring to the correspondence table 51a.

FIG. 6 is a diagram illustrating an example of the correspondence table 51b indicating the relationship among the response levels included in the packet information table 51, necessity of an immediate response, and operating clock frequencies of the main CPU 2. In FIG. 6, the leftmost column illustrates the response levels, the column to the right illustrates descriptions of network packets, the column further to the right illustrates the necessity of an immediate response to a network packet, and the rightmost column illustrates the operating frequencies of the main CPU 2. A network packet having a response level "undetermined" is a type of network packet that is not stored in the packet information table 51.

The determining unit 24 refers to the correspondence table 51b and acquires an operating frequency of the main CPU 2 in accordance with the response level. The period control unit 25 also refers to the correspondence table 51b and acquires information indicating whether an immediate response to the network packet is requested, in accordance with the response level.

In other words, the determining unit 24 refers to the packet information table 51 including the correspondence tables 51a and 51b, and acquires the operating frequency of the main CPU 2, in accordance with the type of the network packet. The period control unit 25 refers to the packet information table 51, and acquires immediate response necessity information, in accordance with the type of the network packet.

Figure 7:
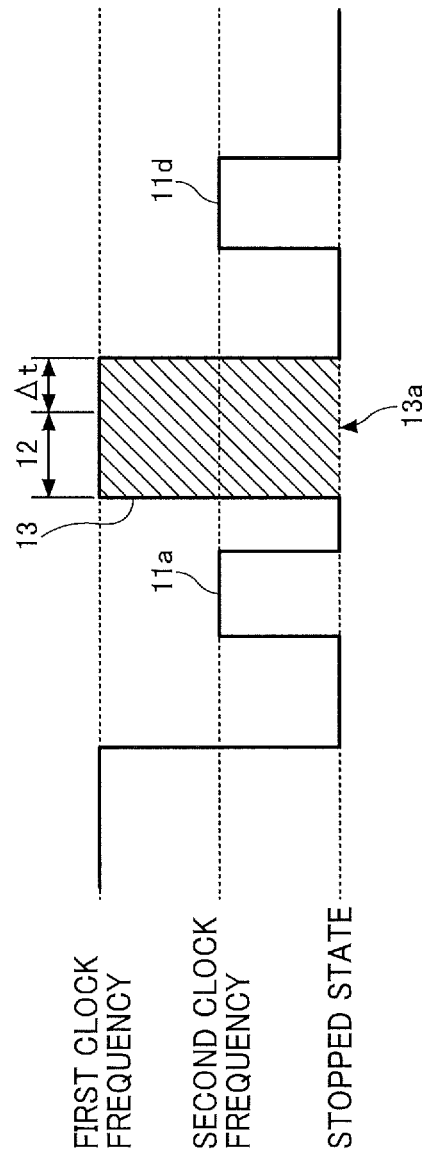
FIG. 7 is a graph for explaining an example of a packet response process in the image processing apparatus according to the embodiment.

FIG. 7 is a graph for explaining an example of a packet response process in the image processing apparatus 1 for a network packet that requests an immediate response. The network packet that requests an immediate response in FIG. 7 is of response level "4" or "undetermined" in FIG. 6.

In FIG. 7, after the polling activation period 11a, the main CPU 2 is activated during the interrupt activation period 13 by an interrupt accompanying reception of the network packet.

In a case where the network packet requests an immediate response, the determining unit 24 determines the first clock frequency to be the operating frequency of the main CPU 2. Therefore, during an interrupt activation period 13, the operating frequency of the main CPU 2 is raised from the second clock frequency to the first clock frequency.

In a case where the network packet requests an immediate response, the period control unit 25 extends the second period during which the main CPU 2 is activated by the interrupt control unit 34. Accordingly, the interrupt activation period 13 is extended by Δt as compared with the interrupt activation period 12 described above with reference to FIG. 2.

As the operating frequency of the main CPU 2 is raised to the first clock frequency, the packet response process can be performed at a higher speed. Further, as the interrupt activation period 13 is extended till completion of the packet response process, the packet response process can be completed without waiting for the next polling activation period 11d. As a result, the packet response process is completed earlier than in the case described above with reference to FIG. 2, and a packet response process period 13a is shortened.

FIGS. 8A to 8C are graphs for explaining examples of packet response processes in the image processing apparatus 1 for various types of network packets. FIG. 8A is a graph for explaining a case where an immediate response is not requested and the packet response process can be completed at the first clock frequency. FIG. 8B is a graph for explaining a case where an immediate response is not requested and the packet response packet response process can be completed at the second clock frequency. FIG. 8C is a graph for explaining a case where the priority on the packet response process time is low.

The network packet in FIG. 8A is of response level "3" in FIG. 6. In FIG. 8A, the operating frequency of the main CPU 2 during an interrupt activation period 14 is determined to be the first clock frequency by the determining unit 24. The period control unit 25 does not extend the second period, and the packet response process is completed within the second period, as indicated as a packet response process period 14a.

The network packet in FIG. 8B is of response level "2" in FIG. 6. In FIG. 8B, the operating frequency of the main CPU 2 during an interrupt activation period 15 is determined to be the second clock frequency by the determining unit 24. As the second clock frequency is the lower clock frequency, power consumption is smaller than in a case where the main CPU is operated at the first clock frequency. The period control unit 25 does not extend the second period, and the packet response process is completed within the second period, as indicated as a packet response process period 15a.

The network packet in FIG. 8C is of response level "1" in FIG. 6. In FIG. 8C, the operating frequency of the main CPU 2 during an interrupt activation period 16 is determined to be the second clock frequency by the determining unit 24. In this case, power consumption is also smaller than in a case where the main CPU 2 is operated at the first clock frequency. The period control unit 25 does not extend the second period. The packet response process is not completed within the second period, but is completed within the next polling activation period 11d, as indicated as packet response processing periods 16a.

In this manner, in accordance with the type of the network packet, the determining unit 24 determines the operating frequency, and the period control unit 25 controls the period during which the main CPU 2 is activated. Although FIGS. 7 and 8A to 8C illustrate example cases where the main CPU 2 is activated by the interrupt control unit 34, the same applies in cases where the main CPU 2 is activated by the polling control unit 32.

Figure 9:
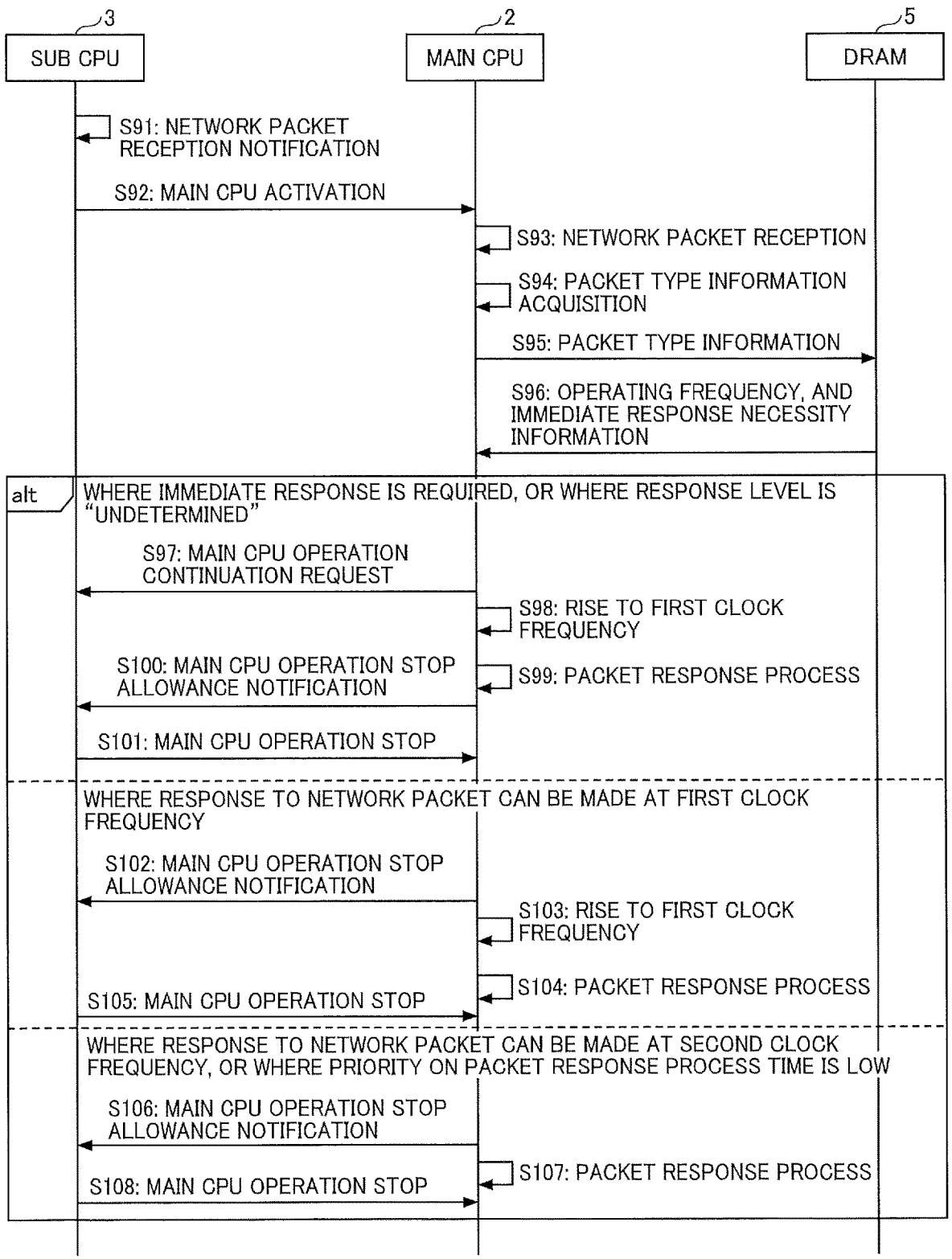
FIG. 9 is a sequence chart illustrating an example operation of the image processing apparatus according to the first embodiment.

Operation of the Image Processing Apparatus 1 According to the First Embodiment Next, operation of the image processing apparatus 1 is described. FIG. 9 is a sequence chart for explaining an example operation of the image processing apparatus 1. Referring to FIG. 9, a case where the main CPU 2 stopped by the power saving function is activated by the interrupt control unit 34 is described as an example.

First, in step S91, the packet reception monitoring unit 33 monitors reception of a network packet by the image processing apparatus 1, and notifies the interrupt control unit 34 of reception of a network packet when the image processing apparatus 1 receives the network packet.

In step S92, the interrupt control unit 34 outputs a control signal to the main CPU 2 via the sub input/output unit 31, and activates the main CPU 2 stopped by the power saving function for the predetermined second period.

In step S93, the packet response unit 23 performs a process of receiving the network packet during the second period in which the main CPU 2 is activated by the interrupt control unit 34.

In step S94, the packet response unit 23 acquires protocol information analyzed in the process of receiving the network packet in step S93 as packet type information indicating the type of the network packet, and outputs the packet type information to both the determining unit 24 and the period control unit 25.

In step S95, the determining unit 24 and the period control unit 25 each output the packet type information to the DRAM 5 via the main input/output unit 21.

In step S96, the determining unit 24 refers to the packet information table 51 stored in the DRAM 5, and determines the operating frequency of the main CPU 2. The period control unit 25 also acquires the immediate response necessity information.

If the immediate response necessity information acquired in step S96 is a request for an immediate response, or if the response level is "undetermined", the period control unit 25 requests the interrupt control unit 34 to keep the main CPU 2 operating via the main input/output unit 21 and the sub input/output unit 31 in step S97.

In step S98, the determining unit 24 raises the operating frequency of the main CPU 2 from the second clock frequency to the first clock frequency.

In step S99, the packet response unit 23 performs a packet response process.

After the packet response process is completed, the packet response unit 23 in step S100 notifies the interrupt control unit 34 via the main input/output unit 21 and the sub input/output unit 31 that the operation of the main CPU 2 can be stopped.

In step S101, the interrupt control unit 34 stops the operation of the main CPU 2.

If the immediate response necessity information acquired in step S96 is not a request for an immediate response, and the first clock frequency is determined to be the operating frequency (a case where a response to the network packet can be made at the first clock frequency), on the other hand, the packet response unit 23 in step S102 notifies the interrupt control unit 34 via the main input/output unit 21 and the sub input/output unit 31 that the operation of the main CPU 2 can be stopped.

In step S103, the determining unit 24 raises the operating frequency of the main CPU 2 from the second clock frequency to the first clock frequency.

In step S104, the packet response unit 23 performs a packet response process.

In step S105, the interrupt control unit 34 stops the operation of the main CPU 2.

If the immediate response necessity information acquired in step S96 is not a request for an immediate response, and the second clock frequency is determined to be the operating frequency (a case where a response to the network packet can be made at the second clock frequency), or if the priority on the packet response process time is low, on the other hand, the packet response unit 23 in step S106 notifies the interrupt control unit 34 via the main input/output unit 21 and the sub input/output unit 31 that the operation of the main CPU 2 can be stopped.

In step S107, the packet response unit 23 performs a packet response process.

In step S108, the interrupt control unit 34 stops the operation of the main CPU 2.

In this manner, the image processing apparatus 1 can activate the main CPU 2 stopped by the power saving function, and perform a packet response process.

Although FIG. 9 illustrates an example case where the main CPU 2 stopped by the power saving function is activated by the interrupt control unit 34, the operation illustrated in FIG. 9 can also be applied in a case where the main CPU 2 is activated by the polling control unit 32. In that case, however, the interrupt control unit 34 is replaced with the polling control unit 32, and the period control unit 25 extends the first period.

Effects of the Image Processing Apparatus 1 According to the First Embodiment

As described above, in a case where the main CPU stopped by the power saving function is activated in response to reception of a network packet, the image processing apparatus according to this embodiment determines the operating frequency of the main CPU, in accordance with the type of the network packet.

In a case where the type of the network packet requests a high-speed response such as an immediate response, the operating frequency of the main CPU 2 is determined to be the first clock frequency, so that the packet response process can be performed at high speed, and the packet response process can be correctly performed without delay.

Further, in this embodiment, in a case where the main CPU stopped by the power saving function is activated in response to reception of a network packet, a predetermined activation period for the main CPU 2 is extended in accordance with the type of the network packet.

In a case where the type of the network packet requests a high-speed response such as an immediate response, the predetermined activation period for the main CPU 2 is extended, so that the packet response process can be completed within the activation period, and the packet response process can be correctly performed without delay.

There are various kinds of network packets: network packets that request an immediate response, network packets with which the packet response process can be completed within the second period at the first clock frequency, network packets with which the packet response process can be completed within the second period even at the second clock frequency, network packets with a low priority on the response time, and the like. As the operating frequency of the main CPU 2 is determined depending on the type of such a network packet, and the activation period is then controlled, the packet response process can be completed within an appropriate period, and the power consumption can be optimized.

Here, as a comparative example, the software configuration of the sub CPU may be expanded so that the sub CPU has the functions of the packet response unit 23, and, in a case where an immediate response is requested, the sub CPU is made to perform the packet response process. However, the program to be executed by the sub CPU runs in a small-capacity SRAM, and therefore, it might be difficult for the sub CPU to perform the packet response process. Furthermore, if the capacity of the SRAM is increased, the cost might increase. Since the sub CPU does not have the functions of the packet response unit 23 in this embodiment, it is possible to perform the packet response processing corresponding to the type of the network packet, without an increase in the capacity of the SRAM.

Further, in the example described in this embodiment, the period control unit 25 notifies the polling control unit 32 or the interrupt control unit 34 of a notification of an operation continuation request, via the sub input/output unit 31 and the main input/output unit 21. However, the embodiment is not limited to this example. For example, the status of an operation continuation flag provided in a shared common memory space such as the DRAM 5 shared by the main CPU 2 and the sub CPU 3 may be changed so that a notification of an operation continuation request is issued. In this manner, even in a case where the sub CPU 3 does not include any communication unit such as the sub input/output unit 31, the period control unit 25 can notify the polling control unit 32 or the interrupt control unit 34 of an operation continuation request.

Second Embodiment Next, an image processing apparatus 1a according to a second embodiment is described.

In the packet information table 51, the information indicating the relationship among the network packet types included in the packet information table 51, operating frequencies of the main CPU 2, and/or the necessity/unnecessity of immediate responses to network packets might not be correct with respect to the relationship in a case where a packet response process is actually performed.

For example, at the start of creation of the packet information table 51, it is predicted that a packet response process can be completed within a predetermined period while the main CPU 2 operates at the second clock frequency, and response level "2" is set to a predetermined network packet type. In practice, however, there are cases where a packet response process cannot be completed within the predetermined period. In such a case, the appropriate response level for the predetermined network packet type is "3", and therefore, it is preferable to update the response level for this network packet type to "3".

In another example, at the start of creation of the packet information table 51, it is predicted that a packet response process can be completed within a predetermined period while the main CPU 2 operates at the second clock frequency, and response level "2" is set to a predetermined network packet type. In practice, however, even if the main CPU 2 operates at the first clock frequency, a packet response process is not completed within the predetermined period in some cases. In such a case, the appropriate response level for the predetermined network packet type is "1", and therefore, it is preferable to update the response level for this network packet type to "1".

In this embodiment, the packet information table is correctly updated, in accordance with the time measured from the time when a packet response process was actually started till the time when the packet response process was completed.

Functional Configuration of the Image Processing Apparatus 1a According to the Second Embodiment The functional configuration of the image processing apparatus 1a according to this embodiment is now described.

Figure 10:
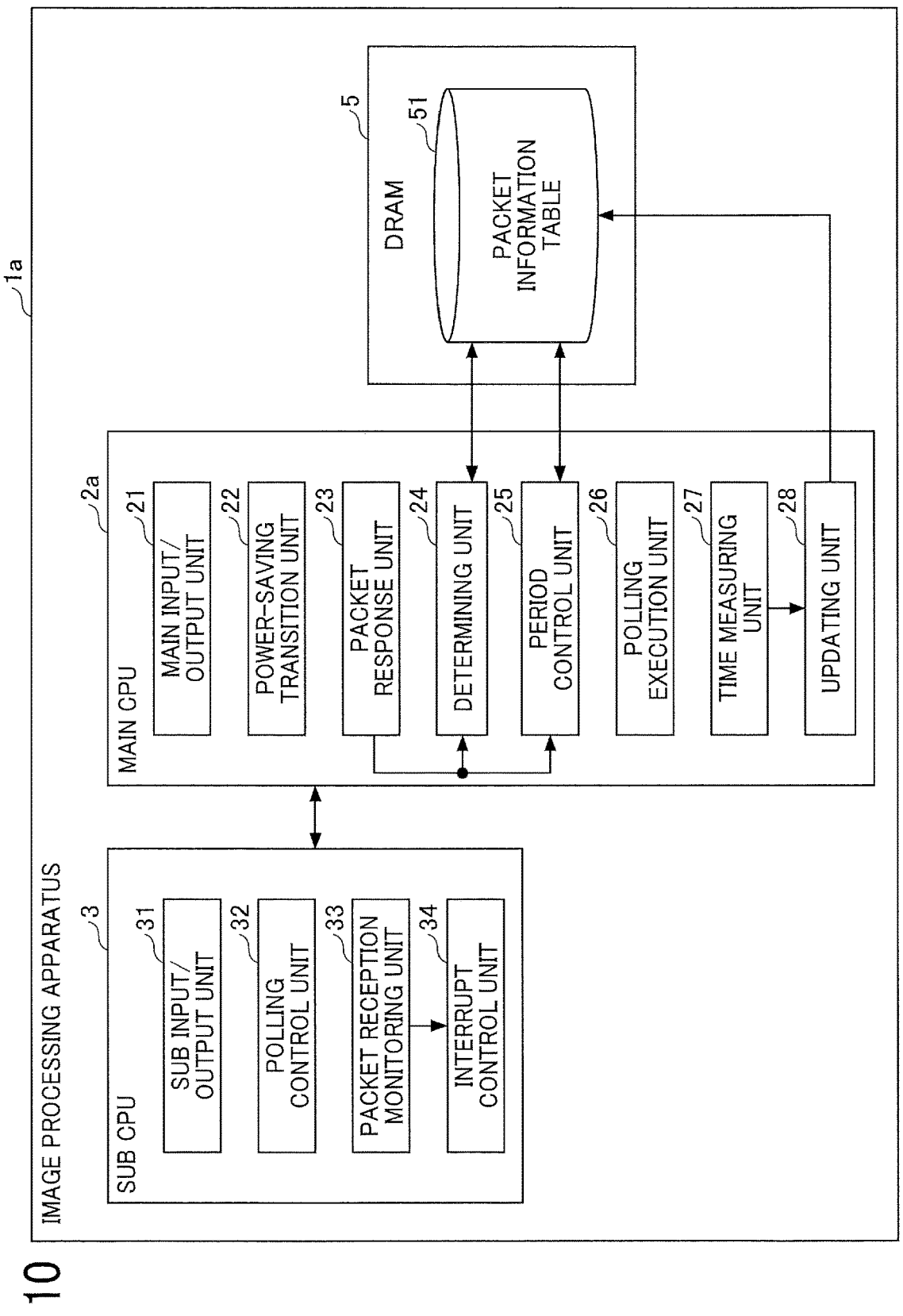
FIG. 10 is a block diagram illustrating an example of the functional configuration of an image processing apparatus according to a second embodiment.

FIG. 10 is a block diagram illustrating an example of the functional configuration of the image processing apparatus 1a. As illustrated in FIG. 10, the image processing apparatus 1a includes a time measuring unit 27 and an updating unit 28. The functions of the time measuring unit 27 and the updating unit 28 are realized by a main CPU 2a and the like.

The time measuring unit 27 measures the time having elapsed from the time when the packet response unit 23 started a packet response process till the time when the packet response process was completed, and outputs the measurement result to the updating unit 28.

In one example, the time measuring unit 27 starts counting the clock of the main CPU 2a at the time when the packet response unit 23 starts a packet response process, and stops the counting at the time when the packet response unit 23 ends the packet response process. The count number is then converted into time, and thus, the elapsed time is measured.

If operations of stopping and activating the main CPU 2a fall between the start time and the end time of a packet response process, the elapsed time cannot be accurately measured. Therefore, the time measuring unit 27 preferably has a function to check that operation of stopping and activating the main CPU 2a do not fall between the start time and the end time of a packet response process.

In accordance with the measurement result input from the time measuring unit 27, the updating unit 28 updates information indicating the relationship among the network packet types included in the packet information table 51, operating frequencies of the main CPU 2a, and/or necessity of an immediate response to a network packet. More specifically, in accordance with the measurement result input from the time measuring unit 27, the updating unit 28 updates the correspondence table 51a indicating the relationship between the network packet types and the response levels included in the packet information table 51.

Operation of the Image Processing Apparatus 1a According to the Second Embodiment Next, operation of the image processing apparatus 1a is described.

Figure 11:
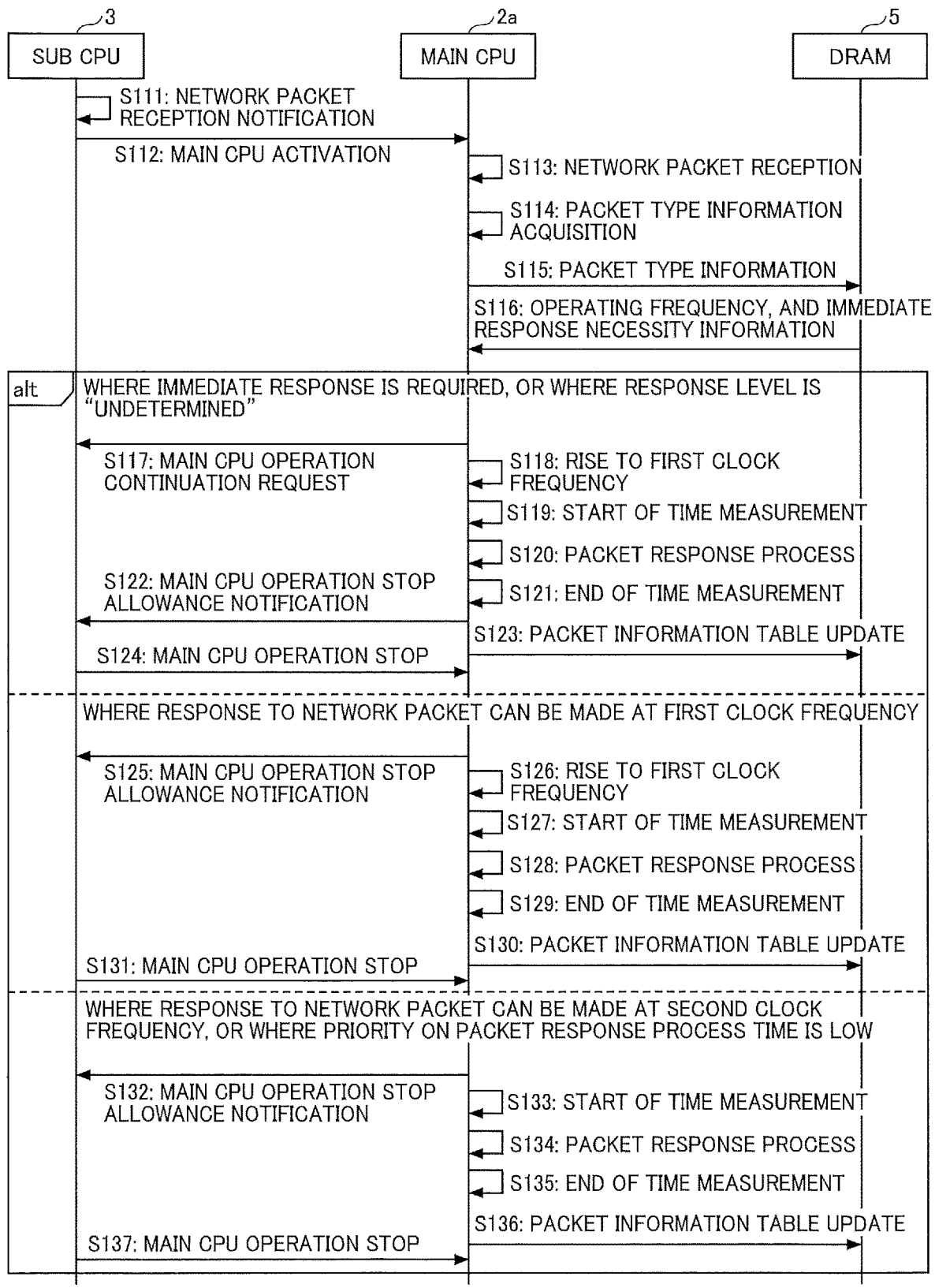
FIG. 11 is a sequence chart illustrating an example operation of the image processing apparatus according to the second embodiment.

FIG. 11 is a sequence chart for explaining an example operation of the image processing apparatus 1a. In the description below, explanation of the same aspects as those illustrated in the sequence chart in FIG. 9 might be skipped.

In FIG. 11, in a case where the immediate response necessity information acquired in step S116 is a request for an immediate response, or where the response level is "undetermined", the time measuring unit 27 in step S119 starts measuring time at the timing when the packet response unit 23 starts a packet response process.

In step S120, the packet response unit 23 performs the packet response process.

In step S121, the time measuring unit 27 ends the time measurement at the timing when the packet response unit 23 completes the packet response process, and outputs the measurement result to the updating unit 28.

In step S122, the packet response unit 23 notifies the interrupt control unit 34 via the main input/output unit 21 and the sub input/output unit 31 that the operation of the main CPU 2a can be stopped.

In step S123, the updating unit 28 updates the packet information table 51, in accordance with the elapsed time information input from the time measuring unit 27.

In step S124, the interrupt control unit 34 stops the operation of the main CPU 2a.

Note that the order of step S122 and step S123 may be changed as appropriate, or step S122 and step S123 may be carried out in parallel. Likewise, the order of step S123 and step S124 may be changed as appropriate, or step S123 and step S124 may be carried out in parallel.

Further, in a case where the immediate response necessity information acquired in step S116 is not a request for an immediate response, and the first clock frequency is determined to be the operating frequency (where a response to the network packet can be made at the first clock frequency), the time measuring unit 27 in step S127 starts time measurement at the timing when the packet response unit 23 starts a packet response process.

In step S128, the packet response unit 23 performs the packet response process.

In step S129, the time measuring unit 27 ends the time measurement at the timing when the packet response unit 23 completes the packet response process, and outputs the measurement result to the updating unit 28.

In step S130, the updating unit 28 updates the packet information table 51, in accordance with the elapsed time information input from the time measuring unit 27.

In step S131, the interrupt control unit 34 stops the operation of the main CPU 2a.

Note that the order of step S130 and step S131 may be changed as appropriate, or step S130 and step S131 may be carried out in parallel.

In a case where the immediate response necessity information acquired in step S116 is not a request for an immediate response, and the second clock frequency is determined to be the operating frequency (where a response to the network packet can be made at the second clock frequency), or where the priority on the packet response process time is low, on the other hand, the time measuring unit 27 in step S133 starts time measurement at the timing when the packet response unit 23 starts a packet response process.

In step S134, the packet response unit 23 performs the packet response process.

In step S135, the time measuring unit 27 ends the time measurement at the timing when the packet response unit 23 completes the packet response process, and outputs the measurement result to the updating unit 28.

In step S136, the updating unit 28 updates the packet information table 51, in accordance with the elapsed time information input from the time measuring unit 27.

In step S137, the interrupt control unit 34 stops the operation of the main CPU 2a.

Note that the order of step S136 and step S137 may be changed as appropriate, or step S136 and step S137 may be carried out in parallel.

In this manner, the image processing apparatus 1a can correctly update the packet information, in accordance with the time measured from the start time till the completion time of the packet response process.

Effects of the Image Processing Apparatus 1a According to the Second Embodiment

As described above, the packet information table 51 is correctly updated in accordance with the time measured from the start time till the completion time of the packet response process. Thus, even in a case where the packet information table 51 is not correctly created, the packet information table 51 can be optimized in accordance with a result of a packet response process actually performed. At the start of the creation of the packet information table 51, the operating frequency of the main CPU 2a and the like are set in accordance with prediction based on the type of a network packet, and therefore, the packet information table 51 is not correct in some cases. In such cases, this embodiment is particularly suitable.

The effects other than the above are the same as those described above in the first embodiment.

Although the embodiments have been described so far, the present disclosure is not limited to the above embodiments specifically disclosed, and various changes and modifications may be made to them without departing from the scope of the claims.

In the examples described above as the embodiments, the respective functional units are formed by software using a CPU. However, the respective functional units may be formed with hardware such as electronic circuits and electric circuits.

The embodiments also include an image processing method. For example, the image processing method is an image processing method that is implemented by an image processing apparatus including a first processor having a power saving function, and a second processor that consumes less power than the first processor during operation. The image processing method includes the step of determining the operating frequency of the first processor in accordance with the type of a network packet in a case where the first processor stopped by the power saving function is activated in response to reception of the network packet. By such an image processing method, the same effects as those of the above-described image processing apparatuses can be achieved.

The embodiments further include a program. For example, the program is a program to be executed by an image processing apparatus including a first processor having a power saving function and a second processor that consumes less power than the first processor during operation. The program causes a computer to perform a process of determining the operating frequency of the first processor in accordance with the type of a network packet in a case where the first processor stopped by the power saving function is activated in response to reception of the network packet. With such a program, the same effects as those of the above-described image processing apparatus can be achieved.

Further, the respective functions of the embodiments described above can be realized by one or a plurality of processing circuits. Here, "processing circuits" in this specification include a processor programmed to execute the respective functions with software, such as a processor implemented by an electronic circuit, and a device designed to execute the respective functions described above, such as an application specific integrated circuit (ASIC), a digital signal processor (DSP), a field programmable gate array (FPGA), or a conventional circuit module. The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus comprising:
a first processor having a power saving function; and
a second processor configured to consume less power than the first processor during operation,
wherein, when the first processor stopped by the power saving function is activated in response to reception of a network packet, the first processor determines an operating frequency of the first processor in accordance with a type of the network packet, and
wherein the first processor determines a first clock frequency to be the operating frequency when the network packet received by the first processor requests an immediate response, and determines a second clock frequency to be the operating frequency when the network packet received by the first processor does not request the immediate response, the second clock frequency being lower than the first clock frequency.

2. The image processing apparatus according to claim 1, wherein, in accordance with the type of the network packet, the first processor refers to a packet information table including information indicating a relationship between the type of the network packet and the operating frequency and determines the operating frequency.

3. The image processing apparatus according to claim 2, wherein the first processor updates the packet information table, in accordance with a time measured from a start time till a completion time of a process of responding to the network packet.

4. The image processing apparatus according to claim 1, wherein the first processor extends a predetermined activation period of the first processor in accordance with the type of the network packet when the first processor stopped by the power saving function is activated in response to reception of the network packet.

5. The image processing apparatus according to claim 4, wherein the first processor and the second processor share a common memory space, and the first processor changes a status of an operation continuation flag in the common memory space, to extend the predetermined activation period.

6. The image processing apparatus according to claim 4, wherein, when the network packet received by the first processor requests an immediate response, the first processor extends the predetermined activation period.

7. The image processing apparatus according to claim 4, wherein, in accordance with the type of the network packet, the first processor refers to a packet information table including information indicating a relationship between the type of the network packet and necessity of an immediate response to the network packet and extends the predetermined activation period.

8. The image processing apparatus according to claim 1, wherein the first processor stopped by the power saving function is activated for a certain period at predetermined intervals.

9. The image processing apparatus according to claim 8, wherein, when the first processor stopped by the power saving function is activated in response to reception of the network packet, the first processor extends a predetermined activation period of the first processor in accordance with the type of the network packet and extends the certain period in accordance with the type of the network packet.

10. The image processing apparatus according to claim 1, wherein the first processor stopped by the power saving function is activated for a certain period by an interrupt in response to reception of the network packet.

11. The image processing apparatus according to claim 10, wherein, when the first processor stopped by the power saving function is activated in response to reception of the network packet, the first processor extends a predetermined activation period of the first processor in accordance with the type of the network packet and extends the certain period in accordance with the type of the network packet.

12. An image processing method for an image processing apparatus that includes a first processor having a power saving function and a second processor configured to consume less power than the first processor during operation, the image processing method comprising:
determining an operating frequency of the first processor in accordance with a type of a network packet when the first processor stopped by the power saving function is activated in response to reception of the network packet, and
determining, by the first processor, a first clock frequency to be the operating frequency when the network packet received by the first processor requests an immediate response, and determining, by the first processor, a second clock frequency to be the operating frequency when the network packet received by the first processor does not, request the immediate response, the second clock frequency being lower than the first clock frequency.

13. A non-transitory recording medium storing program code to be executed by an image processing apparatus including a first processor having a power saving function and a second processor that consumes less power than the first processor during operation, the program code causing a computer to perform a process of:
determining an operating frequency of the first processor in accordance with a type of a network packet when the first processor stopped by the power saving function is activated in response to reception of the network packet, and
determining, by the first processor, a first clock frequency to be the operating frequency when the network packet received by the first processor requests an immediate response, and, determining, by the first processor, a second clock frequency to be the operating frequency when the network packet received by the first processor does not request the immediate response, the second clock frequency being lower than the first clock frequency.

* * * * *